United States Patent
Shimoda et al.

(10) Patent No.: US 6,303,735 B1
(45) Date of Patent: Oct. 16, 2001

(54) POLYCARBONATE PRODUCTION METHOD

(75) Inventors: Tomoaki Shimoda, Ichihara; Hiromi Ishida; Kazushige Inoue, both of Moka, all of (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/583,269

(22) Filed: May 31, 2000

(30) Foreign Application Priority Data

Jun. 11, 1999 (JP) .................................................. 11-165584

(51) Int. Cl.$^7$ ..................................................... C08G 64/00
(52) U.S. Cl. ............................................. 528/196; 528/198
(58) Field of Search ...................................... 528/196, 198

(56) References Cited

U.S. PATENT DOCUMENTS 5,606,007  2/1997  Sakashita et al. ................... 528/176

FOREIGN PATENT DOCUMENTS

| 0 535 261 A1 | 4/1993  | (EP) . |
| 0 738 579 A  | 10/1996 | (EP) . |
| 0 905 178 A  | 3/1999  | (EP) . |
| 0 905 184 A  | 3/1999  | (EP) . |
| 4046928      | 2/1992  | (JP) . |
| 4089824      | 3/1992  | (JP) . |
| 4175368      | 6/1992  | (JP) . |

OTHER PUBLICATIONS

International Search Report for International Application No. PCT/US 00/15672.

*Primary Examiner*—Terressa M. Boykin

(57) ABSTRACT

A polycarbonate production method, characterized in that a dihydroxy compound and a carbonic acid diester are subjected to melt polycondensation in the presence of a catalyst containing an alkali metal compound and/or alkaline-earth metal compound in an amount of $1 \times 10^{-8}$ to $1 \times 10^{-5}$ mol per mole of dihydroxy compound; wherein a sulfonic acid ester compound and a transition metal scavenger are also added to the reaction product; and wherein the polycarbonate is treated at a reduced pressure.

8 Claims, No Drawings

POLYCARBONATE PRODUCTION METHOD

The present application is a U.S. non-provisional application based upon and claiming priority from Japanese Application No. HEI 11-165584, which is hereby incorporated by reference.

BACKGROUND OF THE INVENTION

The present invention relates to a method for producing polycarbonates by ester interchange, and more particularly to a method for producing an aromatic polycarbonate of high molecular weight, improved color tone, and low mold contamination during molding by means of an ester interchange reaction involving an aromatic dihydroxy compound and a carbonic acid diester compound.

In recent years, aromatic polycarbonates have come to be widely used in a variety of fields as engineering plastics having excellent impact resistance and other mechanical characteristics, and possessing superior heat resistance, transparency, and the like.

A so-called phosgene process, in which bisphenols and other aromatic dihydroxy compounds are caused to react with phosgene by interfacial polycondensation, is commercialized as a method for producing aromatic polycarbonates. The phosgene technique currently implemented on a commercial scale has a number of drawbacks, however. Examples of these drawbacks include the need to use extremely toxic phosgene, to process large amounts of sodium chloride byproducts, and to prevent air pollution issues and which may be brought about by the methylene chloride commonly used as a reaction solvent.

A method (melt process) for subjecting aromatic dihydroxy compounds and carbonic acid diesters to ester interchange reactions in which sodium hydroxide and other alkali metal salts are used as catalysts is known as a process for producing aromatic polycarbonates by a technique other than a phosgene process. This method is advantageous in that aromatic polycarbonates can be produced inexpensively, and has recently attracted particular attention because it dispenses with the use of phosgene, methylene chloride, or other toxic materials, and is hence preferred.

To produce a high-molecular-weight polycarbonate having excellent mechanical characteristics by such a melt process, it is necessary to distill out bisphenols, diphenyl carbonate, and other unreacted monomers from the high-viscosity polycarbonate melt. The resulting polycarbonate is therefore commonly exposed to high temperatures (250 to 330° C.) in a high vacuum for extended periods of time. Sodium hydroxide and other alkali metal compounds, however, sometimes act as catalysts in ester interchange reactions, initiating decarboxylation reactions, Kolbe-Schmitt analog reactions, and other side reactions. These side reactions are disadvantageous in that the polycarbonate branches expressed by the formula shown below are produced, cross-linked products are obtained, the resulting polycarbonates are discolored, and difficulties are encountered during the production of the high-quality materials with balanced color tones and molecular weights commonly produced by the melt process ("Polycarbonate Resins," Nikkan Kogyo Shimbunsha Publishing House, Sep. 30,1969).

Chemical Formula 1

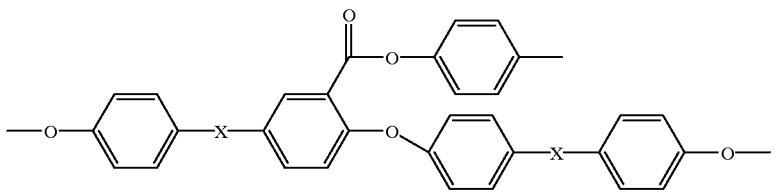

(where X is a straight or branched hydrocarbon group).

Various methods aimed at overcoming these shortcomings have been proposed. For example, JP (Kokai) 4-89824 discloses catalysts comprising (1) chlorine-containing basic compounds, (2) alkali metal compounds or alkaline-earth metal compounds, and (3) phosphoric acid or phosphoric acid esters; JP (Kokai) 4-46928 discloses catalysts comprising (1) electron-donating amine compounds and (2) alkali metal compounds or alkaline-earth metal compounds; and JP (Kokai) 4-175368 discloses a method in which melt polycondensation is performed in the presence of an alkaline compound catalyst, an acidic compound and an epoxy compound are then added to the resulting reaction product, and the material is then treated at a reduced pressure.

The aforementioned method, however, is not necessarily successful in overcoming problems such as polycarbonate discoloration and mold contamination during molding.

As a result of research conducted in view of this situation, the inventors perfected the present invention upon discovering that the discoloration, mold contamination, and other such problems are caused by Fe, Ti, Cr, and other transition metal components released by the reactors, piping, and other equipment used during the melt polycondensation of polycarbonates, and found that a polycarbonate having an improved color tone and causing less mold contamination can be efficiently produced by a method in which a transition metal scavenger is added together with a sulfonic acid ester compound to a reaction product obtained by the melt polycondensation of a dihydroxy compound and a carbonic acid diester in presence of a catalyst containing an alkali metal compound, and the material is then treated at a reduced pressure.

A goal of the present invention, which was perfected in view of the above-described condition of prior art, is to provide an efficient method of producing a polycarbonate that has an excellent color tone and causes less mold contamination during molding.

SUMMARY OF THE INVENTION

The polycarbonate production method pertaining to the present invention is characterized in that a dihydroxy compound and a carbonic acid diester are subjected to melt polycondensation in the presence of a catalyst containing an alkali metal compound and/or alkaline-earth metal compound in an amount of $1\times10^{-8}$ to $1\times10^{-5}$ mol per mole of dihydroxy compound; a sulfonic acid ester compound and a transition metal scavenger are then added to the reaction product; and the material is treated at a reduced pressure.

One preferred transition metal scavenger is phosphorous acid. The transition metal scavenger should preferably be added in an amount ranging from 0.1 to 3 ppm in relation to the polycarbonate product.

At least one compound selected from methyl p-toluenesulfonate, ethyl p-toluenesulfonate, and butyl p-toluenesulfonate should preferably be used as the sulfonic acid ester.

DETAILED DESCRIPTION OF THE INVENTION

The polycarbonate production method pertaining to the present invention will now be described in detail. The polycondensation starting materials used in the polycarbonate production method pertaining to the present invention will first be described.

Polycondensation Starting Materials

A dihydroxy compound and a carbonic acid diester are used as polycondensation starting materials for the production method in accordance with the present invention.

No particular restrictions are imposed on the dihydroxy compounds that can be used in the present invention. Bisphenols expressed by Formula [I] below may be used, for example.

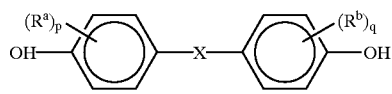

[I]

(where $R^a$ and $R^b$, which may be the same or different, are each a halogen atom or a monovalent hydrocarbon group; p and q are integers from 0 to 4; X is

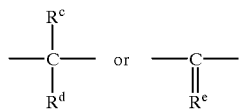

$R^c$ and $R^d$ are hydrogen atoms or monovalent hydrocarbon groups optionally formed into cyclic structures; and $R^e$ is a divalent hydrocarbon group).

Specific examples of bisphenols expressed by Formula [I] above include 1,1-bis(4-hydroxyphenyl)methane, 1,1-bis(4-hydroxyphenyl)ethane, 2,2-bis(4-hydroxyphenyl)propane (hereinafter "bisphenol A"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and other bis(hydroxyaryl)alkanes, as well as 1,1-bis(4-hydroxyphenyl)cyclopropane, 1,1-bis(4-hydroxyphenyl)cyclohexane, and other bis(hydroxyaryl)cycloalkanes.

Other examples that can be cited with reference to the present invention include bisphenols for which the X in the above formula denotes —O—, —S—, —SO—, or —SO$_2$—, such as 4,4'-dihydroxydiphenyl ether, 4,4'-dihydroxy-3,3'-dimethylphenyl ether, and other bis(hydroxyaryl)ethers; 4,4'-dihydroxydiphenyl sulfide, 4,4'-dihydroxy-3,3'-dimethylphenyl sulfide, and other bis(hydroxydiaryl) sulfides; 4,4'-dihydroxydiphenyl sulfoxide, 4,4'-dihydroxy-3,3'-dimethylphenyl sulfoxide, and other bis(hydroxydiaryl) sulfoxides; and 4,4'-dihydroxydiphenyl sulfone, 4,4'-dihydroxy-3,3'-dimethylphenyl sulfone, and other bis(hydroxydiaryl)sulfones.

Compounds expressed by Formula [II] below may also be cited as examples of such bisphenols.

[II]

(where $R^f$ is a halogen atom or a $C_{1-10}$ hydrocarbon group or halogen-substituted hydrocarbon group, and n is an integer from 0 to 4, with the $R^f$ groups being the same or different when n is 2 or greater).

Specific examples of the bisphenols expressed by Formula [II] include resorcin, 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafluororesorcin, 2,3,4,6-tetrafluororesorcin, and other substituted resorcins; catechol; and hydroquinone, 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafluorohydroquinone, 2,3,5,6-tetrabromohydroquinone, and other substituted hydroquinones.

The 2,2,2',2'-tetrahydro-3,3,3',3'-tetramethyl-1,1'-spirobi-[1H-indene]-6,6'-diol expressed by the formula below may be used as such a bisphenol.

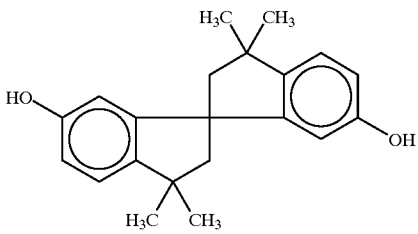

Of these, the bisphenols expressed by Formula [I] above are preferred, and bisphenol A is particularly preferred.

The present invention also allows two, three, or more dihydroxy compounds to be combined to produce a polycarbonate copolymer.

Examples of carbonic acid diesters that can be used in the present invention include diphenyl carbonate, bis(2,4-dichlorophenyl)carbonate, bis(2,4,6-trichlorophenyl)carbonate, bis(2-cyanophenyl)carbonate, bis(o-nitrophenyl)carbonate, ditolyl carbonate, m-cresyl carbonate, dinaphthyl carbonate, bis(diphenyl)carbonate, diethyl carbonate, dimethyl carbonate, dibutyl carbonate, and dicyclohexyl carbonate. Of these, diphenyl carbonate is preferred for use. Two or more such compounds may be used together. To reiterate, diphenyl carbonate is particularly preferred among these.

The carbonic acid diester used in the present invention may contain a dicarboxylic acid or dicarboxylic acid ester. Specifically, the carbonic acid diester may contain a dicarboxylic acid or dicarboxylic acid ester in an amount of 50 mol % or less, and preferably 30 mol % or less.

Examples of such dicarboxylic acids or dicarboxylic acid esters include terephthalic acid, isophthalic acid, sebacic acid, decanodioic acid, dodecanodioic acid, diphenyl sebacate, diphenyl terephthalate, diphenyl isophthalate, diphenyl decanodioate, and diphenyl dodecanodioate. The carbonic acid diester may also contain two or more such dicarboxylic acids or dicarboxylic acid esters.

A polyester polycarbonate is obtained upon polycondensation of the aforementioned aromatic dihydroxy compound and a carbonic acid diester containing such dicarboxylic acids or dicarboxylic acid esters.

During the production of a polycarbonate in accordance with the present invention, the carbonic acid diester should be used in an amount of 0.95 to 1.30 mol, and preferably 1.01 to 1.20 mol, per mole of the total amount of the aromatic dihydroxy compound.

Another feature of the production method pertaining to the present invention is that a polycarbonate copolymer can also be produced using a polyfunctional compound having three or more functional groups per molecule together with the aforementioned aromatic dihydroxy compound and carbonic acid diester.

A compound having phenolic hydroxyl groups or carboxyl groups is preferred as such a polyfunctional compound.

A compound having three phenolic hydroxyl groups is particularly preferred. Specific examples include 1,1,1-tris(4-hydroxyphenyl)ethane, 2,2',2"-tris(4-hydroxyphenyl)diisopropylbenzene, α-methyl-α,α',α'-tris(4-hydroxyphenyl)-1,4-diethylbenzene, α,α',α"-tris(4-hydroxyphenyl)-1,3,5-triisopropylbenzene, fluoroglycine, 4,6-dimethyl-2,4,6-tri(4-hydroxyphenyl)-heptane-2, 1,3,5-tri(4-hydroxyphenyl)benzene, 2,2-bis-[4,4-(4,4'-dihydroxyphenyl)-cyclohexyl]-propane, trimellitic acid, 1,3,5-benzenetricarboxylic acid, and pyromellitic acid.

Of these, 1,1,1-tris(4-hydroxyphenyl)ethane, α,α',α"-tris(4-hydroxyphenyl)-1,3,5-triisopropylbenzene, and the like are preferred for use.

When employed, such polyfunctional compounds are used in amounts that are commonly 0.03 mol or less, preferably 0.001 to 0.02 mol, and ideally 0.001 to 0.01 mol, per mole of the total amount of the aromatic dihydroxy compound.

According to the present invention, the content of alkali metal compounds and/or alkaline-earth metal compounds in the dihydroxy compound and carbonic acid diester should be no more than $1 \times 10^{-7}$ per mole of the dihydroxy compound.

Before being used, these polycondensation starting materials are commonly purified by distillation, recrystallization, or another method using production equipment in which contamination with impurities can be accurately controlled.

The present invention also allows an end blocker to be used together with the aromatic dihydroxy compound and carbonic acid diester during the production of a polycarbonate.

An allyloxy compound capable of introducing the end groups expressed by General Formula [II] below into the molecule ends of the resulting polycarbonate can be used as such an end blocker.

ArO—    [II], where Ar is a $C_{6-50}$ aromatic hydrocarbon group. The aromatic hydrocarbon groups are not limited in any particular way and may be phenyl groups, naphthyl groups, anthranyl groups, and other condensed rings, or rings formed by these aromatic rings with saturated hydrocarbons and/or hetero atoms. These aromatic rings may also be substituted by halogens or $C_{1-9}$ alkyl groups.

The following compounds may be cited as specific examples of such allyloxy compounds: phenol, diphenyl carbonate, p-tert-butyl phenol, p-tert-butylphenylphenyl carbonate, p-tert-butylphenyl carbonate, p-cumyl phenol, p-cumylphenylphenyl carbonate, p-cumylphenyl carbonate, 2,2,4-trimethyl-4-(4-hydroxyphenyl)chroman, 2,2,4,6-tetramethyl-4-(3,5-dimethyl-4-hydroxyphenyl)chroman, 2,2,3-trimethyl-3-(4-hydroxyphenyl)chroman, 2,2,3,6-tetramethyl-3-(3,5-dimethyl-4-hydroxyphenyl)chroman, 2,4,4-trimethyl-2-(2-hydroxyphenyl)chroman, 2,4,4,6-tetramethyl-2-(3,5-dimethyl-2-hydroxyphenyl)chroman, and other chroman compounds.

These allyloxy compounds may be used singly or as combinations.

The allyloxy compounds are used in amounts that are commonly 0.01 to 0.2 mol, preferably 0.02 to 0.15 mol, and ideally 0.02 to 0.1 mol, per mole of the aromatic dihydroxy compound.

Using an allyloxy compound as an end blocker in such an amount allows the molecule ends of the resulting polycarbonate to be blocked with the end groups expressed by General Formula [I] above in a ratio of 1 to 95%, preferably 10 to 95% and ideally 20 to 90%.

Thus, a polycarbonate containing the end groups expressed by General Formula [I] in the above-described proportions has excellent heat resistance and possesses superior impact resistance and other mechanical characteristics even at a low molecular weight.

The present invention allows an aliphatic monocarboxylic compound capable of introducing aliphatic hydrocarbon units expressed by General Formula [IV] below to be optionally used as an end blocker together with the above-described allyloxy compounds.

    [IV]

In the formula, R is an alkyl group that has 10 to 30 carbon atoms and may be straight-chain, branched, or halogen-substituted.

Specific examples of such aliphatic monocarboxylic compounds include undecanoic acid, lauric acid, tridecanoic acid, pentadecanoic acid, palmitic acid, heptadecanoic acid, stearic acid, nonadecanoic acid, heneicosanoic acid, tricosanoic acid, mellisic acid, and other alkyl monocarboxylic acids, as well as methyl stearate, ethyl stearate, phenyl stearate, and other methyl, ethyl, or phenyl esters of these alkyl monocarboxylic acids.

These may be used singly or as combinations.

The aliphatic monocarboxylic compounds are used in amounts that are commonly 0.01 to 0.20 mol, preferably 0.02 to 0.15 mol, and ideally 0.02 to 0.10 mol, per mole of the aromatic dihydroxy compound.

The polymerization rate is sometimes reduced when an end blocker is used in a combined amount of 0.2 mol or greater per mole of the aromatic dihydroxy compound.

Polycondensation Step

According to the present invention, the above-described polycondensation starting materials are polycondensed in the presence of a polycondensation catalyst.

Polycondensation Catalyst

In the present invention, an alkali metal compound and/or alkaline-earth metal compound is used as the polycondensation catalyst.

Examples of alkali metal and alkaline-earth metal compounds include organic acid salts, inorganic acid salts, oxides, hydroxides, hydrides, alcoholates, and other compounds of alkali metal or alkaline-earth metals. Specific examples are sodium hydroxide; potassium hydroxide; lithium hydroxide; sodium hydrogen carbonate; potassium nitrogen carbonate; lithium hydrogen carbonate; sodium carbonate; potassium carbonate; lithium carbonate; sodium acetate; potassium acetate; lithium acetate; sodium stearate; potassium stearate; lithium stearate; sodium borohydride; lithium borohydride; phenylated boron-sodium; sodium benzoate; potassium benzoate; lithium benzoate; disodium, dipotassium, and dilithium salts of bisphenol A; sodium, potassium, and lithium salts of phenols; other alkali metal compounds; potassium hydroxide; barium hydroxide; magnesium hydroxide; strontium hydroxide; calcium hydrogen carbonate; barium hydrogen carbonate; magnesium hydrogen carbonate; strontium hydrogen carbonate; calcium carbonate; barium carbonate; magnesium carbonate; strontium carbonate; calcium acetate; barium acetate; magnesium acetate; strontium acetate; calcium stearate; barium stearate; magnesium stearate; and strontium stearate.

These compounds may be used singly or as combinations of two or more compounds.

Such alkali metal compounds and/or alkaline-earth metal compounds should be used in amounts of $1\times10^{-8}$ to $1\times10^{-5}$ mol, and preferably $1\times10^{-7}$ to $2\times10^{-6}$ mol, per mole of the dihydroxy compound.

According to the present invention, a compound (component (b)) that can be decomposed or vaporized at a temperature of 100 to 300° C. can be used as a catalyst together with the above-described alkali metal compound and/or alkaline-earth metal compound (component (a)). Basic compounds can be cited as examples of compounds (component (b)) that can be decomposed or vaporized at a temperature of 100 to 300° C. At least one type of compound selected from the group consisting of ammonium compounds and phosphonium compounds is preferred, and at least one type of compound selected from the group consisting of quaternary ammonium compounds and quaternary phosphonium compounds is particularly preferred.

Examples of the particularly preferred quaternary ammonium compounds include tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide ($Me_4NOH$). Examples of the particularly preferred quaternary phosphonium compounds include tetramethylphosphonium hydroxide ($Me_4POH$), tetraethylphosphonium hydroxide ($Et_4POH$), and tetrabutylphosphonium hydroxide ($Bu_4POH$). These compounds may be used singly or as combinations of two or more compounds.

Component (b) (that is, a compound that can be decomposed or vaporized at a temperature of 100 to 300° C.) should be used in an amount of $1\times10^{-7}$ to $1\times10^{-1}$ mol, and preferably $1\times10^{-5}$ to $1\times10^{-2}$ mol, per mole of the dihydroxy compound. Using component (b) (that is, a compound that can be decomposed or vaporized at a temperature of 100 to 300° C.) in such an amount reduces the likelihood of a reduction in molecular weight occurring after heat aging and makes it possible to obtain a polycarbonate that has excellent color tone, heat resistance, and water resistance.

Boric acid or a boric acid ester (component (c)) can also be used as a catalyst. A boric acid ester expressed by the following general formula may be used.

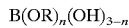

$B(OR)_n(OH)_{3-n}$ (where R is a methyl, ethyl, or other alkyl group, or a phenyl or other aryl group; and n is 1, 2, or 3).

Specific examples of boric acid esters include trimethyl borate, triethyl borate, tributyl borate, trihexyl borate, triheptyl borate, triphenyl borate, tritolyl borate, and trinaphthyl borate.

Component (c) (boric acid ester) should be used in an amount of $1\times10^{-8}$ to $1\times10^{-1}$ mol, and preferably $1\times10^{-7}$ to $1\times10^{-2}$ mol, per mole of the dihydroxy compound. Using component (c) (boric acid ester) in such an amount reduces the likelihood of a decrease in molecular weight occurring after heat aging and makes it possible to obtain an organopolysiloxane that has excellent color tone, heat resistance, and water resistance.

Polycondensation Step

The dihydroxy compound and carbonic acid diester can be polycondensed under the same conditions as those maintained during conventional polycondensation reactions.

Specifically, a bisphenol and a carbonic acid diester are allowed to react in the first reaction stage at a temperature of 80 to 250° C., preferably 100 to 230° C., and ideally 120 to 190° C., for 0 to 5 hours, preferably 0 to 4 hours, and ideally 0 to 3 hours, under normal pressure. The reaction temperature is then increased while the reaction system is brought to a reduced pressure, a reaction between the bisphenol and carbonic acid diester is performed, and the bisphenol and carbonic acid diester are finally polycondensed at a reduced pressure (5 mm Hg or lower, and preferably 1 mm Hg or lower) and a temperature of 240 to 320° C.

The polycondensation reaction may be performed as a continuous process or a batch process. The reaction apparatus used to perform this reaction may be a tank reactor, a tubular reactor, or a columnar reactor.

Measured in 20° C. methylene chloride, the intrinsic viscosity of the polycarbonate thus obtained is commonly 0.10 to 1.0 dL/g, and preferably 0.30 to 0.65 dL/g.

The above-described production method allows a polycarbonate (hereinafter "polycarbonate [A]") having an excellent color tone to be obtained with high polymerization activity.

According to the present invention, sulfonic acid ester compound [B] and transition metal scavenger [C] are added to polycarbonate [A] (reaction product obtained), and the material is treated at a reduced pressure. In preferred practice, sulfonic acid ester compound [B] and transition metal scavenger [C] are added and treated at a reduced pressure while the polycarbonate [A] is in the molted state.

Ethyl benzenesulfonate, butyl benzenesulfonate, methyl p-toluenesulfonate, ethyl p-toluenesulfonate, butyl p-toluenesulfonate, or the like should preferably be used as sulfonic acid ester compound [B]. Sulfonic acid ester compound [B] should be used in an amount of 0.1 to 50 molar multiples, preferably 0.1 to 15 molar multiples, and ideally 0.1 to 7 molar multiples, in relation to the amount of the alkali metal compounds and alkaline-earth metal compounds used in the reaction involving polycarbonate [A]. (When the alkali metal compounds and alkaline-earth metal compounds are contained in the polycondensation starting materials, this amount includes the total amount added as a catalyst and contained in the starting materials.) Excess sulfonic acid ester [B] is removed in gaseous form by the reduced-pressure treatment. Adding sulfonic acid ester compound [B] in such an amount to the reaction product (polycarbonate [A]) neutralizes or weakens the alkali metals and alkaline-earth metals remaining in the polycarbonate, ultimately making it possible to obtain a polycarbonate with even higher residence stability and water resistance.

Examples of transition metal scavenger [C] include phosphorous acid, phosphorous acid monoalkyl esters, phosphorous acid dialkyl esters, thioether compounds, EDTA, and other chelating agents, of which phosphorous acid is particularly preferred.

Such a transition metal scavenger should be added in an amount of 0.1 to 3 ppm, and preferably 0.2 to 2.5 ppm, in relation to the resulting polycarbonate.

The transition metal scavenger thus added traps the Fe, Ti, Cr, and other transition metal components released by the reaction equipment, piping, and other components used during the melt polycondensation of polycarbonate, making it possible to obtain a polycarbonate that has an excellent color tone and is less likely to contaminate the mold during molding. Water resistance is sometimes adversely affected if the transition metal scavenger is added in an amount greater than 3 ppm.

According to the present invention, water [D] may also be added together with acidic compound [B] and transition metal scavenger [C]. Water [D] is added in an amount that is 5 to 1000 ppm, preferably 10 to 500 ppm, and ideally 20 to 300 ppm, in relation to polycarbonate [A]. Adding water [D] further increases the efficiency with which the polycondensation catalyst in polycarbonate [A] is neutralized and makes it possible to obtain a polycarbonate having excellent residence stability in molten state and possessing exceptional color tone, transparency, water resistance, and weatherability.

Polycarbonate [A] is molded using a single-screw extruder, twin-screw extruder, static mixer, or other common blender, which may or may not be equipped with a vent.

According to the present invention, sulfonic acid ester compound [B] and transition metal scavenger [C] should be added while the polycarbonate [A] obtained by the polycondensation reaction is in the molten state in a reactor or extruder. Sulfonic acid ester compound [B] and transition metal scavenger [C] are not limited in terms of addition sequence and may be added separately or concurrently, with the latter option being particularly preferred.

According to the present invention, a treatment is performed at a reduced pressure after sulfonic acid ester compound [B] and transition metal scavenger [C] have been added to polycarbonate [A].

No particular restrictions are imposed on the treatment apparatus used to perform such a reduced-pressure treatment. It is possible, for example, to use a reactor equipped with a pressure-reducing device, or an extruder equipped with a pressure-reducing device.

When the reduced-pressure treatment is performed using such a reactor, the pressure should be set between 0.05 and 750 mm Hg, and preferably between 0.05 and 5 mm Hg.

The treatment should be performed for about 10 seconds to 15 minutes when the reduced-pressure treatment is performed using an extruder, and for about 5 minutes to 3 hours when a reactor is used. In addition, the reduced- pressure treatment should preferably be performed at a temperature of about 240 to 350° C.

When the reduced-pressure treatment is performed using an extruder, it is possible to use a vented single-screw extruder or twin-screw extruder. Another option is to perform pelletizing while performing the reduced-pressure treatment by means of an extruder. The reduced-pressure treatment should be performed at a pressure of 1 to 750 mm Hg, and preferably 5 to 700 mm Hg.

Performing the reduced-pressure treatment in this manner yields a polycarbonate with a reduced residual monomer or oligomer content. It is thus possible to obtain a polycarbonate product characterized by excellent molding quality and reduced mold contamination during molding in addition to having high residual stability during molding and exceptional acid resistance, water resistance, and heat resistance as a molded article. Furthermore, the frequency with which the mold is replaced can be reduced. It is also possible to obtain polycarbonate molded articles that remain highly stable in terms of color tone for a long time, and can therefore be used in optical applications (sheets, lenses, compact disks, and the like), outdoor applications (automobiles and the like), and various other applications (housings and the like).

Additives [E] may also be added to polycarbonate [A] as long as the object of the present invention is not adversely affected. Additives [E] may be added to polycarbonate [A] after [B] and [C] have been added and a reduced-EOL pressure treatment has been performed.

Specific examples of additives [E] include additives commonly added to polycarbonates in accordance with the intended application, such as heat stabilizers, epoxy compounds, UV absorbers, mold release agents, colorants, antistatic agents, slip agents, antiblocking agents, lubricants, antifogging agents, natural oils, synthetic oils, waxes, organic fillers, and inorganic fillers.

The polycarbonate thus produced can be optionally pelletized when used in a variety of applications. The polycarbonate produced by the manufacturing method of the present invention can be used as an optical material with an excellent color tone.

Merits of the Invention

The polycarbonate production method of the present invention allows polycarbonates possessing improved color tones to be produced with high efficiency.

A polycarbonate produced by the method of the present invention can be used as a common molding material, a construction material in the form of sheets or the like, a material for automobile headlamp lenses, a material for optical lenses such as those used in glasses, an optical recording material, or the like. The polycarbonate is particularly suitable as a molding material for optical disks.

WORKING EXAMPLE

The present invention will now be described in further detail through working examples, but the present invention is not limited by these working examples.

Intrinsic Viscosity (IV)

Measured using an Ubbelohde viscometer at 20° C. in methylene chloride.

Yellow Index

An injection-molded article having a thickness of 3.0 mm was molded using a 150-ton molding machine (manufactured by Osumi) at a cylinder temperature of 280° C. and a mold temperature of 80° C. The X, Y and Z values were measured by the transmission method using a Color and Color Difference Meter ND-1001 DP manufactured by Nippon Denshoku Kogyo, and the yellow index [YI] was measured.

$$YI=100(1.277X-1.060Z)/Y$$

Light Transmittance

Measured using the above-described molded article in accordance with the method in ASTM D 1003.

Haze

The haze of the above-described molded article was measured using NDH-200 (manufactured by Nippon Denshoku Kogyo).

Hydrolysis Properties

The above-described molded article was introduced into an autoclave filled with purified water, and aged for 5 days in a 120° C. oven. Post-test haze was measured and used as a hydrolysis index.

Residence Stability

A resin was kept in the cylinder of the above-described molding machine for 15 minutes at a temperature of 320° C. and then molded at this temperature. The color tone (YI) was measured.

Residual Monomer Amount

Polycarbonate (1 g) was dissolved in 3 mL methylene chloride, hexane (20 mL) was added, the ingredients were thoroughly agitated, the resulting filtrate was analyzed by high-speed liquid chromatography, and the content of residual monomers, bisphenol A, and diphenyl carbonate in the polycarbonate was measured.

Evaluation of Mold Contamination

One thousand injection-molded articles with a thickness of 3.0 mm were molded using a 150-ton molding machine (manufactured by Osumi) at a cylinder temperature of 280° C. and a mold temperature of 80° C., and the mold surface was visually inspected.

Working Example 1

Bisphenol A (BPA; 0.44 kmol) and diphenyl carbonate (DPC; 0.46 kmol) were introduced as an aromatic dihydroxy compound and a carbonic acid diester, respectively, into a 250-L stirred tank. The tank was replaced with nitrogen, and the mixture was melted at 140° C.

The mixture was then heated to a temperature of 180° C., sodium hydroxide and tetramethylammonium hydroxide were added as catalysts in amounts of 0.000176 mol ($4 \times 10^{-7}$ mol/mol-bisphenol A) and 0.11 mol (($2.5 \times 10^{-4}$ mol/mol-bisphenol A), respectively, and the components were agitated for 30 minutes.

The pressure was then gradually lowered to 200 mm Hg at the same time as the temperature was raised to 210° C., the pressure was further lowered to 15 mm Hg in 30 minutes at the same time as the temperature was raised to 240° C., the amount in which the phenol was distilled off was measured at constant temperature and pressure, and the system was returned to atmospheric pressure with the aid of nitrogen the moment the phenol could not be distilled off any longer. The resulting reaction product had an intrinsic viscosity [IV] of 0.15 dL/g.

The reaction product was then pressurized with a gear pump and fed to a centrifugal thin-film evaporator, where a reaction was allowed to proceed. The temperature and pressure of the thin-film evaporator were kept at 270° C. and 2 mm Hg, respectively. The reaction product was fed with the aid of a gear pump from the bottom of the evaporator at a rate of 40 kg/hr to a horizontal twin-shaft stirred polymerization tank (L/D=3; diameter of impeller rotation: 220 mm, capacity: 80 L) kept at 280° C. and 0.2 mm Hg, and polymerized at a residence time of 30 min.

The resulting polymer had an intrinsic viscosity (IV) of 0.36 dL/g.

As the reaction product was being fed with the aid of a gear pump from the bottom of the horizontal twin-shaft stirred polymerization tank at a rate of 40 kg/hr to another such horizontal twin-shaft stirred polymerization tank (L/D=3; diameter of impeller rotation: 220 mm, capacity: 80 L) kept at 280° C. and 0.2 mm Hg, butyl p-toluenesulfonate (sulfonic acid ester compound, used as a 1% phenol solution) and phosphorous acid (used as a 1% phenol solution) were fed in amounts of 6 molar multiples with respect to the Na content of the polycarbonate and 2 ppm with respect to the polycarbonate, respectively, and a reduced-pressure treatment was performed at a residence time of 30 minutes, yielding a polymer. The resulting polymer was evaluated by the above-described methods.

The results are shown in Table 1.

Working Examples 2 to 4, Comparative Examples 1 and 2

Polycarbonate polymers were obtained in the same manner as in Working Example 1 except that the type of sulfonic acid ester compound, the amount used, and the consumption of phosphorous acid were varied as shown in Table 1. The resulting polymers were evaluated in the same manner as in Working Example 1.

Reference Example

A polycarbonate polymer obtained without the addition of the sulfonic acid ester or phosphorous acid used in Working Example 1 was evaluated in the same manner as in Working Example 1.

TABLE 1

|  | Working Example 1 | Working Example 2 | Working Example 3 | Working Example 4 | Comparative Example 1 | Comparative Example 2 | Reference Example |
|---|---|---|---|---|---|---|---|
| Amount of sulfonic acid ester compound used | Butyl p-toluene-sulfonate | Butyl p-toluene-sulfonate | Butyl p-toluene-sulfonate | Ethyl p-toluene-sulfonate | Butyl p-toluene-sulfonate | Not used | Not used |
| (molar ratio/Na) | 6 | 3 | 6 | 6 | 6 | | |
| Amount of phosphorous acid used (ppm) | 2 | 2 | 1 | 2 | Not used | 2 | Not used |
| Initial physical properties | | | | | | | |
| Intrinsic viscosity (IV) | 0.36 | 0.36 | 0.36 | 0.36 | 0.37 | 0.37 | 0.36 |
| Yellow index (YI) | 1.0 | 1.0 | 1.0 | 1.0 | 1.3 | 1.1 | 1.1 |
| Light transmittance (%) | 91.0 | 91.0 | 91.0 | 91.0 | 90.8 | 90.9 | 90.8 |
| Haze | 0.3 | 0.3 | 0.3 | 0.3 | 0.3 | 0.4 | 0.4 |

TABLE 1-continued

|  | Working Example 1 | Working Example 2 | Working Example 3 | Working Example 4 | Comparative Example 1 | Comparative Example 2 | Reference Example |
|---|---|---|---|---|---|---|---|
| Residual monomers (ppm) | | | | | | | |
| Phenol | <5 | <5 | <5 | <5 | 20 | 20 | 60 |
| Bisphenol A | <5 | <5 | <5 | <5 | <5 | <5 | 8 |
| Diphenyl carbonate | <5 | <5 | 8 | <5 | 30 | 40 | 550 |
| Hydrolysis properties | | | | | | | |
| Haze | 0.9 | 0.8 | 0.8 | 0.9 | 5.6 | 2.4 | 8.2 |
| Residence stability | | | | | | | |
| Yellow index (YI) | 1.1 | 1.1 | 1.2 | 1.1 | 1.3 | 1.3 | 1.6 |
| Mold contamination | Substantially no clouding | Substantially no clouding | Substantially no clouding | Substantially no clouding | Slight clouding | Slight clouding | Some clouding |
| Visual examination | clouding | clouding | clouding | clouding | clouding | clouding | clouding |

What is claimed is:

1. A polycarbonate production method, comprising: subjecting a dihydroxy compound and a carbonic acid diester to melt polycondensation in the presence of a catalyst which comprises an alkyl metal compound or an alkaline-earth metal compound in an amount of $1 \times 1^{-8}$ to $1 \times 10^{-5}$ mole per mole of dihydroxy compound to form a polycarbonate; adding a sulfonic acid ester compound and a transition metal scavenger to the polycarbonate, wherein the transition metal scavenger comprises a phosphorous acid monoalkyl ester or ethylenediamine tetraacetic acid; and treating the polycarbonate at a reduced pressure.

2. A polycarbonate production method according to claim 1, wherein the transition metal scavenger is phosphorous acid.

3. A polycarbonate production method according to claim 1, wherein said sulfonic acid ester is selected from the group consisting of methyl p-toluenesulfonate, ethyl p-toluenesulfonate, butyl p-toluenesulfonate and combinations thereof.

4. A polycarbonate production method as defined in claim 1, wherein the transition metal scavenger is added in an amount ranging from 0.1 to 3 ppm in relation to the polycarbonate.

5. A polycarbonate made according to the method of claim 1.

6. A polycarbonate which comprises the residue of a catalyst which comprises an alkali metal compound or an alkaline earth metal compound, a sulfonic acid ester compound and a transition metal scavenger.

7. A polycarbonate production method, comprising: subjecting a dihydroxy compound, a carbonic acid diester, and a polyfunctional compound having three or more functional groups to melt polycondensation in the presence of a catalyst which comprises an alkali metal compound or an alkaline-earth metal compound in an amount of $1 \times 10^{-8}$ to $1 \times 10^{-5}$ mole per mole of dihydroxy compound to form a polycarbonate; adding a sulfonic acid ester compound and a transition metal scavenger to the polycarbonate, wherein the transition metal scavenger comprises a phosphorous acid monoalkyl ester or ethylenediamine tetraacetic acid; and treating the polycarbonate at a reduced pressure.

8. A polycarbonate made according to the method of claim 7.

* * * * *

UNITED STATES PATENT AND TRADEMARK OFFICE
CERTIFICATE OF CORRECTION

PATENT NO.    : 6,303,735 B1
DATED         : October 16, 2001
INVENTOR(S)   : Tomoaki Shimoda, Hiromi Ishida and Kazushige Inoue It is certified that error appears in the above-identified patent and that said Letters Patent is hereby corrected as shown below:

Column 13,
Line 24, replace "alkyl" with -- alkyli. --

Signed and Sealed this

Thirtieth Day of September, 2003

JAMES E. ROGAN
*Director of the United States Patent and Trademark Office*